United States Patent
Li et al.

(10) Patent No.: US 11,852,410 B2
(45) Date of Patent: Dec. 26, 2023

(54) BACK-BLOWING UNBLOCKING DEVICE FOR DUSTPROOF SCREEN OF DRYER, DUSTPROOF EQUIPMENT, AND DRYER

(71) Applicant: Jingjin Equipment Inc., Shandong (CN)

(72) Inventors: Jian Li, Shandong (CN); Hongbing Wang, Shandong (CN); Guozhi Liu, Shandong (CN); Xin Wang, Shandong (CN)

(73) Assignee: Jingjin Equipment Inc., Shandong (CN)

( * ) Notice: Subject to any disclaimer, the term of this patent is extended or adjusted under 35 U.S.C. 154(b) by 96 days.

(21) Appl. No.: 17/042,137

(22) PCT Filed: Feb. 19, 2020

(86) PCT No.: PCT/CN2020/075864
§ 371 (c)(1),
(2) Date: Sep. 27, 2020

(87) PCT Pub. No.: WO2021/031539
PCT Pub. Date: Feb. 25, 2021

(65) Prior Publication Data
US 2023/0141778 A1    May 11, 2023

(30) Foreign Application Priority Data
Aug. 21, 2019  (CN) .......................... 201921357037.4

(51) Int. Cl.
*F26B 25/00*    (2006.01)
*B01D 46/72*    (2022.01)
(Continued)

(52) U.S. Cl.
CPC .......... *F26B 25/007* (2013.01); *B01D 46/023* (2013.01); *B01D 46/121* (2022.01);
(Continued)

(58) Field of Classification Search
CPC .......... F26B 25/007; F26B 17/04; F26B 3/04; B01D 46/72; B01D 46/121; B01D 46/71; B01D 46/023
(Continued)

(56) References Cited

U.S. PATENT DOCUMENTS 3,620,234 A *  11/1971  Everroad ............. B01D 46/521
                                                      134/102.1
4,077,781 A    3/1978  Sundstrom
(Continued)

FOREIGN PATENT DOCUMENTS

CN    202539052 A    11/2012
CN    105617788 A    6/2016
(Continued)

OTHER PUBLICATIONS

Corresponding EP search results dated Mar. 24, 2022.
Corresponding IN search results dated Mar. 29, 2022.

*Primary Examiner* — Stephen M Gravini
(74) *Attorney, Agent, or Firm* — Gang Yu

(57) ABSTRACT

A back-blowing unblocking device for the dustproof screen of the dryer, a dustproof equipment, and a dryer are provided. The back-blowing unblocking device for the dustproof screen of the dryer utilizes a closed compartment space of the dryer. The back-blowing unblocking device for the dustproof screen of the dryer includes a high-pressure air main pipe, a high-pressure air horizontal pipe, high-pressure air branch pipes, a shunt connecting pipe, and back-blowing fan-shaped nozzles. A length of each high-pressure air branch pipe is equal to a length of an A-shaped dustproof screen. Both ends of the each high-pressure air branch pipe are closed and an upper center opening is welded to the shunt connecting pipe. Both sides of the each high-pressure air branch pipe are densely arranged with the back-blowing fan-shaped nozzles.

14 Claims, 4 Drawing Sheets

(51) Int. Cl.
*B01D 46/121* (2022.01)
*B01D 46/71* (2022.01)
*B01D 46/02* (2006.01)
*F26B 17/04* (2006.01)
*F26B 3/04* (2006.01)

(52) U.S. Cl.
CPC ............ *B01D 46/71* (2022.01); *B01D 46/72* (2022.01); *F26B 17/04* (2013.01); *F26B 3/04* (2013.01)

(58) Field of Classification Search
USPC .......................................................... 34/572
See application file for complete search history.

(56) References Cited

U.S. PATENT DOCUMENTS

| | | | |
|---|---|---|---|
| 4,445,559 A * | 5/1984 | Coleman | F26B 23/028 144/380 |
| 5,143,528 A * | 9/1992 | Dongelmans | B01D 46/2403 34/82 |
| 5,156,660 A | 10/1992 | Wilson | |
| 6,022,388 A | 2/2000 | Andersson et al. | |
| 6,421,931 B1 * | 7/2002 | Chapman | F26B 17/04 34/210 |
| 10,694,828 B2 * | 6/2020 | Ortiz | A45D 34/04 |
| 2002/0179522 A1 * | 12/2002 | Phillips | B01D 46/2407 96/233 |
| 2011/0162424 A1 * | 7/2011 | Seidel | B26B 13/28 72/38 |
| 2016/0101443 A1 * | 4/2016 | Christensen | B08B 3/02 134/95.2 |
| 2023/0141778 A1 * | 5/2023 | Li | B01D 46/02 34/572 |

FOREIGN PATENT DOCUMENTS

| | | | | |
|---|---|---|---|---|
| CN | 106318472 A | 1/2017 | | |
| CN | 106823568 A | 6/2017 | | |
| CN | 207422843 A | 5/2018 | | |
| CN | 109011894 A | 12/2018 | | |
| DE | 2730925 A1 | 1/1979 | | |
| EP | 0225613 A2 | 6/1987 | | |
| EP | 3799945 A4 * | 5/2022 | ......... | B01D 46/0019 |
| JP | H072001 A | 1/1995 | | |
| RU | 2753852 C1 * | 8/2021 | ......... | B01D 46/0019 |
| WO | 2019117370 A | 6/2019 | | |
| WO | WO-2021031539 A1 * | 2/2021 | ......... | B01D 46/0019 |

* cited by examiner

BACK-BLOWING UNBLOCKING DEVICE FOR DUSTPROOF SCREEN OF DRYER, DUSTPROOF EQUIPMENT, AND DRYER

CROSS-REFERENCE TO RELATED APPLICATION(S)

The present disclosure is a national stage application of International Patent Application No. PCT/CN2020/075864, which is filed on Feb. 19, 2020 and claims priority to Chinese Patent Application No. 201921357037.4, filed on Aug. 21, 2019 and entitled "Back-blowing Unblocking Device for Dustproof Screen of Dryer".

TECHNICAL FIELD

The present disclosure relates to the technical field of general mechanical equipment in thermal engineering, and more particularly, to a dryer dustproof screen back-blowing unblocking device, dustproof equipment, and a dryer.

BACKGROUND

At present, a dryer is mechanical equipment that uses heat energy to reduce a moisture of materials. A filter cake dryer is equipment for continuous drying and subsequent processing of a filter cake formed by the operation of a filter press. The moisture in the filter cake is vaporized and escaped by heating normal pressure convective air to obtain solid materials with specified moisture content. A closed double-layer filter cake dryer is a filter cake dryer with an entire closed compartment space and a double-layer wire mesh conveyor belt. The purpose of the enclosure is to prevent the filter cake from dust hazards, odor emissions and heat loss reduction in the drying process.

However, in the process of drying materials by the dryer, impurities such as dust are easy to accumulate on the dustproof screen of the dryer, causing the phenomenon of dust blocking the screen. In an art known to inventors, in order to prevent the accumulation of dust from affecting the drying effect of the filter cake, workers need to remove the dustproof screen and clean it regularly, which increases the labor intensity of the workers.

SUMMARY

Some embodiments of the present disclosure provide a back-blowing unblocking device for a dustproof screen of a dryer, dustproof equipment, and a dryer, which solves the problem in the art known to inventors of increase of the labor intensity of workers caused by difficulty in cleaning a dustproof screen of a dryer.

To achieve the above purpose, according to some embodiment of the present disclosure, a back-blowing unblocking device for a dustproof screen of a dryer is provided. The back-blowing unblocking device for the dustproof screen of the dryer fully utilizes a vacant closed compartment space of a dryer, and a matching non-stop multi-row back-blowing dense spray high-pressure air unblocking device is added to a dustproof screen. The back-blowing unblocking device for the dustproof screen of the dryer includes a high-pressure air main pipe, a high-pressure air horizontal pipe, high-pressure air branch pipes, a shunt connecting pipe, and back-blowing fan-shaped nozzles. Except for the back-blowing fan-shaped nozzles, all others are welded and formed by stainless steel pipe materials, a length of each high-pressure air branch pipe is equal to a length of an A-shaped dustproof screen, both ends of the each high-pressure air branch pipe are closed and an upper center opening is welded to the shunt connecting pipe, both sides of the each high-pressure air branch pipe are densely arranged with the back-blowing fan-shaped nozzles to form a dense spray form, a row number of the high-pressure air branch pipe is equal to a segment number of the A-shaped dustproof screen to form a dense spray form, the back-blowing unblocking device for the dustproof screen of the dryer is mounted on the dustproof screen to make the back-blowing fan-shaped nozzles located between the two A-shaped dustproof screens, and the high-pressure air main pipe is connected with an air source valve through a hose.

In some embodiments, one end of the high-pressure air main pipe is provided with an arc surface that coincides with an outer circle of the high-pressure air horizontal pipe, and the other end of the high-pressure air main pipe is provided with two parallel threads; both ends of the high-pressure air horizontal pipe are closed, an upper side of the high-pressure air horizontal pipe is provided with air intake holes that coincide with the high-pressure air main pipe, and a lower side of the high-pressure air horizontal pipe is provided with evenly distributed shunt holes that coincide with shunt connecting pipes; and both ends of each of the shunt connecting pipes are provided with arc surfaces that coincide with the shunt holes and an air intake hole of the each high-pressure air branch pipe respectively.

In some embodiments, one end of the back-blowing fan-shaped nozzle is provided with an arc surface that coincides with an air outlet hole of the high-pressure air branch pipe, and the back-blowing fan-shaped nozzle is welded to the air outlet hole; and the other end of the back-blowing fan-shaped nozzle is provided with a nozzle opening in a fan-shaped spray shape, the nozzle opening comprises a V-shaped groove to form the fan-shaped spray shape, and the nozzle opening has a spray angle of 60° and is machined by a stainless steel material.

According to some embodiments of the present disclosure, a dustproof equipment is provided, which includes a frame body, a dustproof screen, and the back-blowing unblocking device for the dustproof screen of the dryer located above the dustproof screen. The dustproof screen and the back-blowing unblocking device for the dustproof screen of the dryer are both disposed on the frame body, the dustproof equipment is located above a material conveyor belt, in a process of conveying materials of the material conveyor belt, a dry airflow is blown to the dustproof equipment by the material conveyor belt, so that dust generated in a drying process is attached to the dustproof screen. The back-blowing unblocking device for the dustproof screen of the dryer is the above back-blowing unblocking device for the dustproof screen of the dryer.

In some embodiments, the dustproof equipment further includes a mesh structure, located below the dustproof screen. The mesh structure comprises a plurality of through holes for a passage of the dust.

In some embodiments, the dustproof equipment further includes a control device. The back-blowing unblocking device for the dustproof screen of the dryer has a back-blowing state in which a back-blowing fan-shaped nozzle sprays gas or liquid to the dustproof screen and a non-working state in which the back-blowing fan-shaped nozzle does not spray gas or liquid, the control device is connected with an air source valve of the back-blowing unblocking device for the dustproof screen of the dryer to control a working state of the air source valve to make the back-blowing unblocking device for the dustproof screen of the dryer switched between the back-blowing state and the non-working state, and when the material conveyor belt conveys materials, the control device controls the back-blowing unblocking device for the dustproof screen of the dryer to be in the non-working state.

In some embodiments, the dustproof equipment further includes a plurality of sub-dustproof assemblies. The plurality of sub-dustproof assemblies are disposed at intervals in a conveying direction of the material conveyor belt. Each of the sub-dustproof assemblies includes: a bracket, including a first support plate body and a second support plate body, the first support plate body and the second support plate body are disposed at an angle, one dustproof screen are laid on the first support plate body, and another dustproof screen are laid on the second support plate body.

In some embodiments, the bracket is of an inverted V-shaped structure.

In some embodiments, each of the sub-dustproof assemblies further includes: a first pressing plate, pressing one dustproof screen on the first support plate body; a second pressing plate, pressing one dustproof screen on the second support plate body; and a crimping member, the adjacent first pressing plate and the second pressing plate are connected through the crimping member.

In some embodiments, a first end of the first support plate body and a first end of the second support plate body form a first opening, a second end of the first support plate body and a second end of the second support plate body form a second opening, and the first opening and/or the second opening are provided with the dustproof screens.

In some embodiments, the dustproof screen is a filter screen, and the filter screen is made of nylon or stainless steel.

According to some embodiments of the present disclosure, a dryer is provided, which includes a base, a fan, the material conveyor belt, a bag filter, and the dustproof equipment. The fan, the material conveyor belt, the bag filter and the dustproof equipment are all disposed on the base, the material conveyor belt is located between the fan and the dustproof equipment in a height direction of the dryer, and the fan is located below the material conveyor belt, and the dustproof equipment is the above dustproof equipment.

Applying the technical solution of the present disclosure, the back-blowing unblocking device for the dustproof screen of the dryer includes a high-pressure air main pipe, a high-pressure air horizontal pipe, high-pressure air branch pipes, a shunt connecting pipe, and back-blowing fan-shaped nozzles. When a dustproof screen needs to be cleaned, a worker turns on an air source valve so that gas enters the high-pressure air main pipe through a hose, and gas in the high-pressure air main pipe enters each shut connecting pipe through the high-pressure air horizontal pipe, and gas entering the shunt connecting pipe enters the high-pressure air branch pipe, and is finally sprayed out through the back-blowing fan-shaped nozzles to clean the dustproof screen.

Compared with the art that requires manual cleaning of the dustproof screen, the back-blowing unblocking device for the dustproof screen of the dryer in some embodiments of the present disclosure replaces the manual cleaning of the dustproof screen, thereby solving the problem in the art of increase of the labor intensity of workers caused by difficulty in cleaning a dustproof screen of a dryer, and reducing the labor intensity of the workers. Meanwhile, when the dustproof screen needs to be cleaned, the worker does not need to remove the dustproof screen from the dryer, which further reduces the labor intensity of the worker. In addition, the back-blowing unblocking device for the dustproof screen of the dryer in some embodiments of the present disclosure fully cleans the dustproof screen at one time without multiple cleaning, which improves the cleaning efficiency of the back-blowing unblocking device for the dustproof screen of the dryer.

BRIEF DESCRIPTION OF THE DRAWINGS

The accompanying drawings, which constitute a part of the present disclosure, are used to provide a further understanding of the present disclosure, and the exemplary embodiments of the present disclosure and the description thereof are used to explain the present disclosure, but do not constitute improper limitations to the present disclosure. In the drawings.

Figure 1:
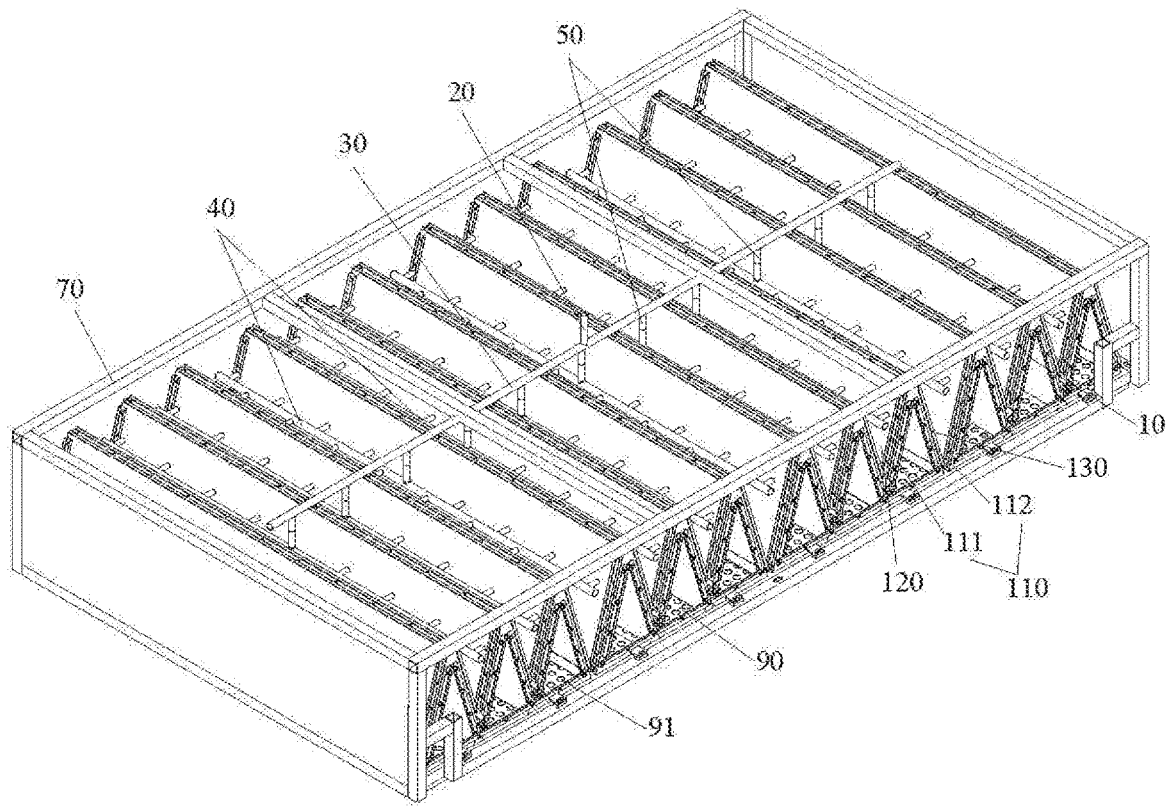
FIG. 1 illustrates a three-dimensional structure schematic diagram of a back-blowing unblocking device for a dustproof screen of a dryer according to an embodiment of the present disclosure applied to dustproof equipment.

The drawings include the following reference signs:

10, dustproof screen; 20, high-pressure air main pipe; 30, high-pressure air horizontal pipe; 40, high-pressure air branch pipe; 50, shunt connecting pipe; 60, back-blowing fan-shaped nozzle; 70, frame body; 80, material conveyor belt; 90, mesh structure; 91, through hole; 100, sub-dustproof component; 110, bracket; 111, first support plate body; 112, second support plate body; 120, first pressing plate; 130, second pressing plate; 140, crimping member; 150, base; 160, fan; 170, bag filter.

DETAILED DESCRIPTION OF THE EMBODIMENTS

It is to be noted that embodiments in the present disclosure and characteristics in the embodiments may be combined under the condition of no conflicts. The present disclosure is described below with reference to the drawings and in conjunction with the embodiments in detail.

It is to be noted that all technical and scientific terms used in the present disclosure have the same meaning as commonly understood by those of ordinary skill in the art to which the present disclosure belongs, unless otherwise indicated.

In the present disclosure, if no explanation is made to the contrary, the orientation words used such as "up, down" usually refer to the direction shown in the drawings, or refer to the vertical, vertical or gravity direction. Similarly, for ease of understanding and description, "left, right" usually refers to the left and right shown in the drawings; "inner, outer" refers to the inner and outer parts relative to the contour of each component, but the above orientation words are not used to limit the present disclosure.

In order to solve a problem in an art known to inventors of increase of the labor intensity of workers caused by difficulty in cleaning a dustproof screen of a dryer, some embodiments of the present disclosure provide a back-blowing unblocking device for the dustproof screen of the dryer, a dustproof equipment, and a dryer.

In some embodiments, the term "back-blowing" refers to blow in the direction opposite to a movement of dust.

Figure 2:
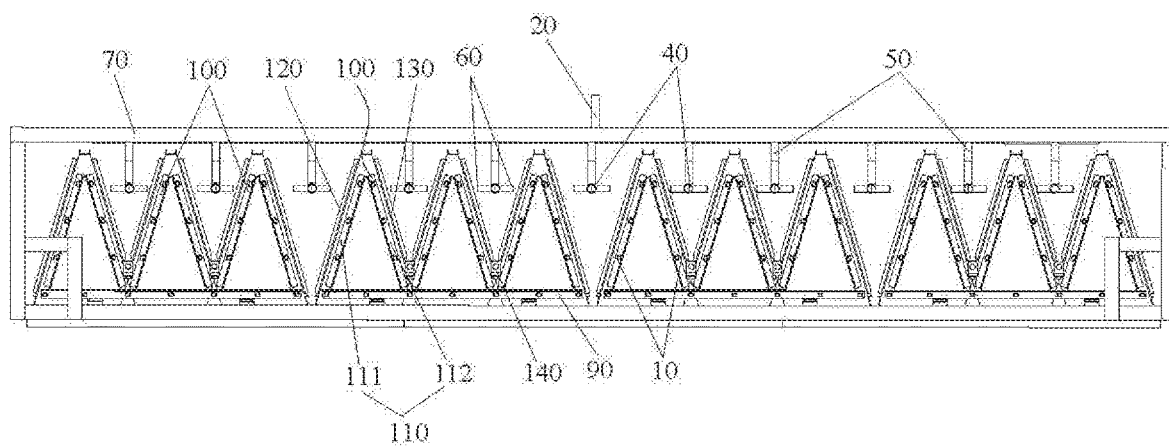
FIG. 2 illustrates a front view of the dustproof equipment in FIG. 1.
Figure 3:
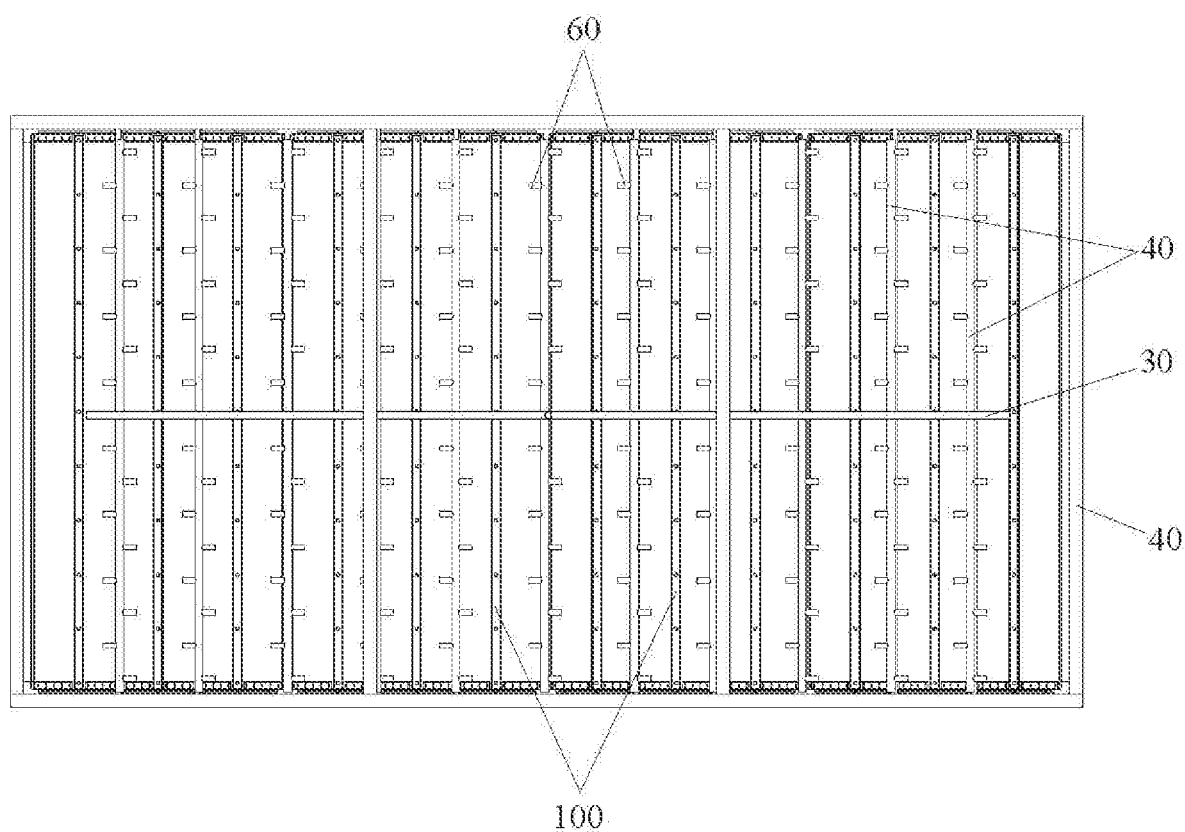
FIG. 3 illustrates a top view of the dustproof equipment in FIG. 1.

As shown in FIG. 1 to FIG. 3, a dryer dustproof screen back-blowing unblocking device fully utilizes a vacant closed compartment space of the dryer, a matching non-stop multi-row back-blowing dense spray high-pressure air unblocking device is added to the dustproof screen 10, and the back-blowing unblocking device for the dustproof screen of the dryer includes a high-pressure air main pipe 20, a high-pressure air horizontal pipe 30, high-pressure air branch pipes 40, shunt connecting pipes 50, and back-blowing fan-shaped nozzles 60. Except for the back-blowing fan-shaped nozzles 60, all others are welded and formed by stainless steel pipe materials, a length of each high-pressure air branch pipe 40 is equal to a length of an A-shaped dustproof screen 10, both ends of the each high-pressure air branch pipe 40 are closed and an upper center opening is welded to a corresponding shunt connecting pipe 50, both sides of the each high-pressure air branch pipe 40 are densely arranged with the back-blowing fan-shaped nozzles 60 to form a dense spray form, a row number of the high-pressure air branch pipes 40 is equal to a segment number of the A-shaped dustproof screen 10 to form a dense spray form, the back-blowing unblocking device for the dustproof screen of the dryer is mounted on the dustproof screen 10 to make the back-blowing fan-shaped nozzles 60 located between the two A-shaped dustproof screens 10, and the high-pressure air main pipe 20 is connected with an air source valve through a hose.

Applying the technical solution of the present embodiment, the back-blowing unblocking device for the dustproof screen of the dryer includes the high-pressure air main pipe 20, the high-pressure air horizontal pipe 30, the high-pressure air branch pipes 40, the shunt connecting pipes 50, and the back-blowing fan-shaped nozzles 60. When the dustproof screen 10 needs to be cleaned, a worker turns on the air source valve so that gas enters the high-pressure air main pipe 20 through the hose, and gas in the high-pressure air main pipe 20 enters each shut connecting pipe 50 through the high-pressure air horizontal pipe 30, and gas entering the each shunt connecting pipe 50 enters the high-pressure air branch pipe 40, and is finally sprayed out through the back-blowing fan-shaped nozzles 60 to clean the dustproof screen 10.

Compared with the art known to inventors that requires manual cleaning of the dustproof screen, the back-blowing unblocking device for the dustproof screen of the dryer in some embodiments of the present disclosure can replace the manual cleaning of the dustproof screen 10, thereby solving the problem in the art known to inventors of increase of the labor intensity of workers caused by difficulty in cleaning the dustproof screen of the dryer, and reducing the labor intensity of the workers. Meanwhile, when the dustproof screen 10 needs to be cleaned, the worker does not need to remove the dustproof screen from the dryer, which further reduces the labor intensity of the worker. In addition, the back-blowing unblocking device for the dustproof screen of the dryer in some embodiments of the present embodiment fully cleans the dustproof screen at one time without multiple cleaning, which improves the cleaning efficiency of the back-blowing unblocking device.

In some embodiments of the present disclosure, the dustproof screen 10 is cleaned by gas, or the dustproof screen 10 is cleaned by liquid, that is, liquid sequentially enters the high-pressure air main pipe 20, the high-pressure air horizontal pipe 30, the high-pressure air branch pipe 40 and the shunt connecting pipe 50, and is finally sprayed onto the dustproof screen 10 through the back-blowing fan-shaped nozzles 60 to clean the dustproof screen 10.

In some embodiments of the present disclosure, a spray direction of the each back-blowing fan-shaped nozzle 60 is a horizontal direction.

As shown in FIG. 1 to FIG. 3, one end of the high-pressure air main pipe 20 is provided with an arc surface that coincides with an outer circle of the high-pressure air horizontal pipe 30, and the other end of the high-pressure air main pipe 20 is provided with two parallel threads. Both ends of the high-pressure air horizontal pipe 30 are closed, an upper side of the high-pressure air horizontal pipe 30 is provided with air intake holes that coincide with the high-pressure air main pipe 20, and a lower side of the high-pressure air horizontal pipe 30 is provided with evenly distributed shunt holes that coincide with the shunt connecting pipes 50. Both ends of the each shunt connecting pipe 50 are provided with arc surfaces that coincide with the shunt holes and an air intake hole of the each high-pressure air branch pipe respectively. In this way, the above arrangement makes the disassembly and assembly of the high-pressure air main pipe 20, the high-pressure air horizontal pipe 30 and the shunt connecting pipes 50 easier and simpler, and reduces the difficulty of disassembly and assembly.

Specifically, one end of the high-pressure air main pipe 20 is connected with the high-pressure air horizontal pipe 30, and the other end of the high-pressure air main pipe 20 is connected with the air source valve. The upper side of the high-pressure air horizontal pipe 30 is connected with the high-pressure air main pipe 20. The lower side of the high-pressure air horizontal pipe 30 is connected with a plurality of branch connecting pipes 50, so that gas entering the high-pressure air horizontal pipe 30 is shunted to each shunt connecting pipe 50, thereby realizing an all-round cleaning of the dustproof screen 10 by the back-blowing unblocking device for the dustproof screen of the dryer, and improving the cleaning efficiency of the back-blowing unblocking device for the dustproof screen of the dryer.

As shown in FIG. 1 to FIG. 3, one end of each back-blowing fan-shaped nozzle 60 is provided with an arc surface that coincides with an air outlet hole of the high-pressure air branch pipe 40, and the each back-blowing fan-shaped nozzle 60 is welded to the air outlet hole. The other end of the each back-blowing fan-shaped nozzle 60 is provided with a nozzle opening in a fan-shaped spray shape, the nozzle opening comprises a V-shaped groove to form the fan-shaped spray shape, and the nozzle opening has a spray angle of 60° and is machined by a stainless steel material. In this way, the above arrangement expands the spray range of the back-blowing fan-shaped nozzles 60, and further improves the cleaning effect of the dustproof screen 10 by the back-blowing fan-shaped nozzles 60.

Figure 4:
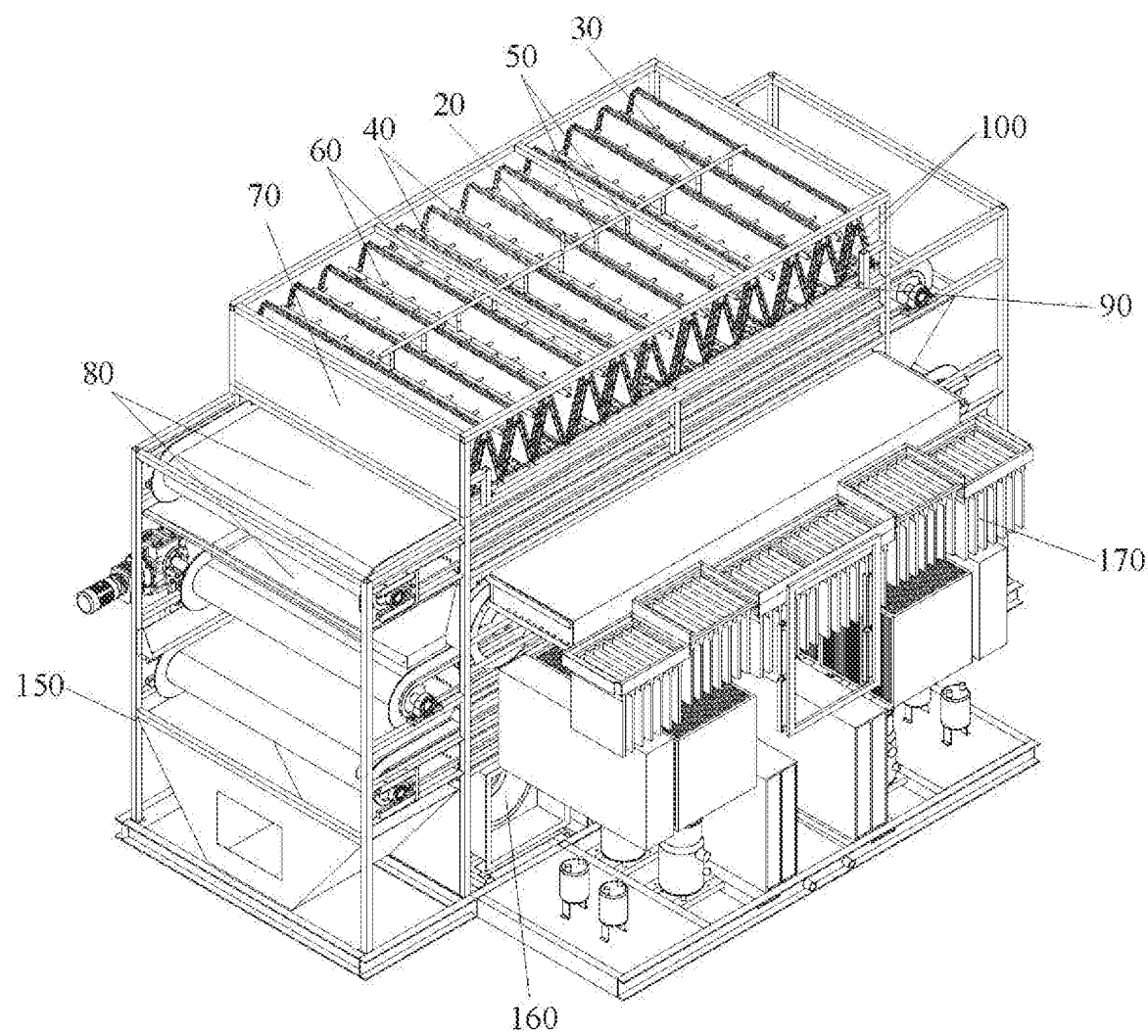
FIG. 4 illustrates a three-dimensional structure schematic diagram of a dryer according to an embodiment of the present disclosure applied to dustproof equipment.
Figure 5:
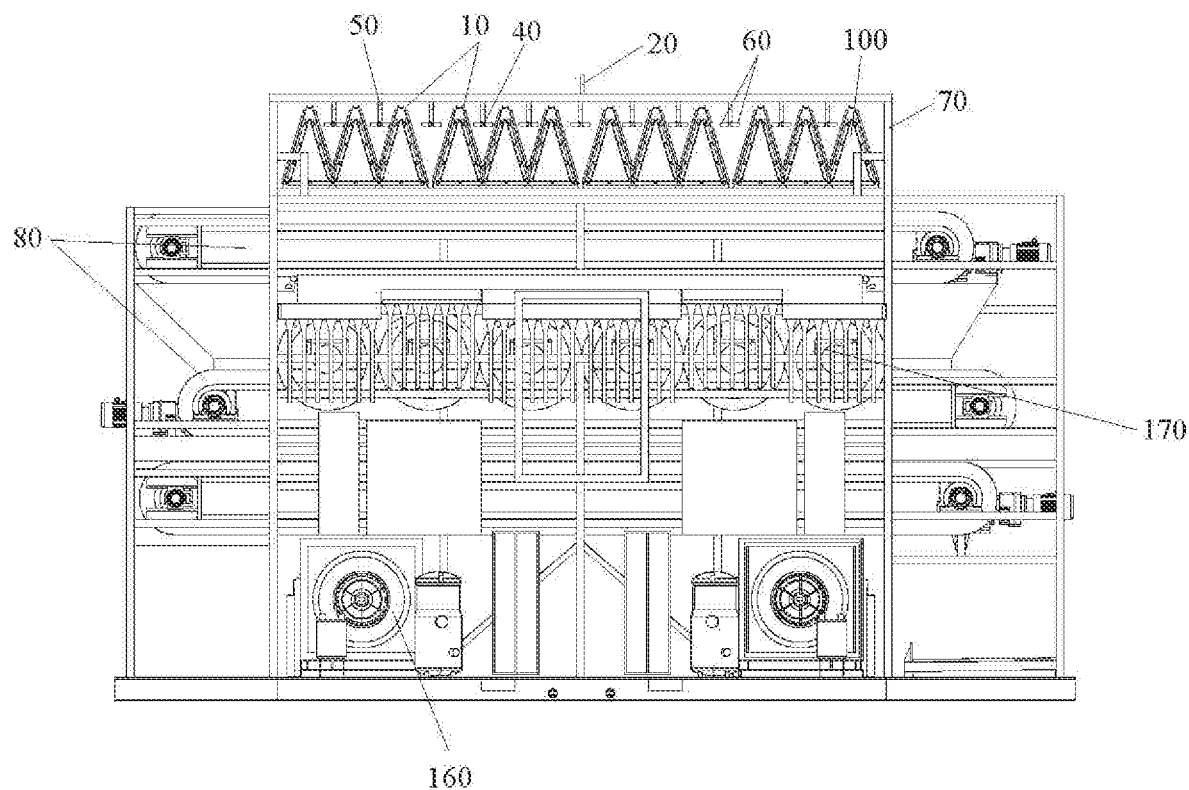
FIG. 5 illustrates a front view of the dryer in FIG. 4.
Figure 6:
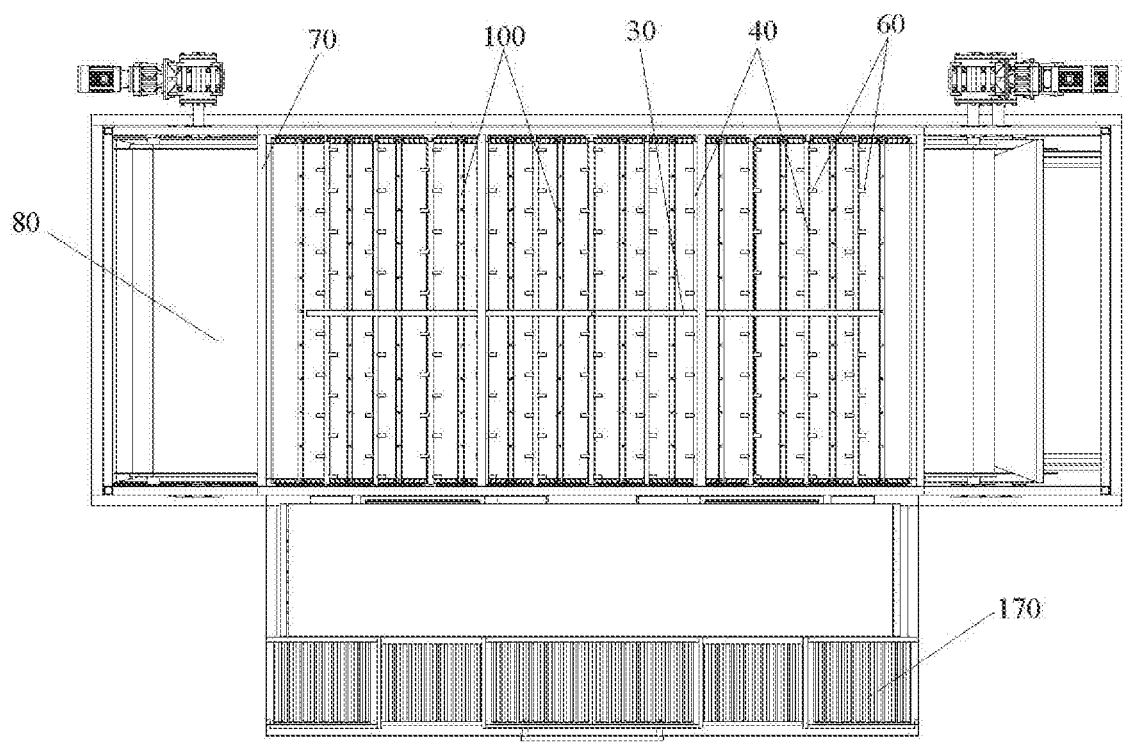
FIG. 6 illustrates a top view of the dryer in FIG. 4.

As shown in FIG. 4 to FIG. 6, some embodiments of the present disclosure also provide a dustproof equipment, which includes a frame body 70, the dustproof screen 10, and the back-blowing unblocking device for the dustproof screen of the dryer located above the dustproof screen 10. The dustproof screen 10 and the back-blowing unblocking device for the dustproof screen of the dryer are both disposed on the frame body 70. The dustproof equipment is located above a material conveyor belt 80. In a process of conveying materials of the material conveyor belt 80, a dry airflow is blown to the dustproof equipment by the material conveyor belt 80, so that dust generated in a drying process is attached to the dustproof screen 10. The back-blowing unblocking device for the dustproof screen of the dryer is the above dryer dustproof screen back-blowing unblocking device. In this way, the above arrangement ensures that the dustproof equipment collects dust and other impurities generated in a material drying process, and prevents the dust and other impurities from affecting a subsequent processing of materials.

In some embodiments, the dustproof screen 10 is located above the material conveyor belt 80, and the back-blowing unblocking device for the dustproof screen of the dryer is located above the dustproof screen 10. The material conveyor belt 80 conveys materials, and a dry airflow is blown to the dustproof equipment through the material conveyor belt 80, and impurities such as dust generated in the drying process are blown onto the dustproof screen 10, thereby preventing impurities such as dust from entering a working environment. When the dustproof screen 10 needs to be cleaned, a worker operates an air source valve so that gas or liquid sequentially enters the high-pressure air main 20, the high-pressure air horizontal pipe 30, the high-pressure air branch pipe 40 and the shunt connecting pipe 50, and is finally sprayed onto the dustproof screen 10 through the back-blowing fan-shaped nozzle 60 to clean the dustproof screen 10, thereby solving the problem in the art of increase of the labor intensity of workers caused by difficulty in cleaning a dustproof screen of a dryer, and reducing the labor intensity of the workers. Meanwhile, when the dustproof screen 10 needs to be cleaned, the worker does not need to remove the dustproof screen from the dryer, which further reduces the labor intensity of the worker.

As shown in FIG. 1, FIG. 2 and FIG. 4, the dustproof device further includes a mesh structure 90. The mesh structure 90 is located below the dustproof screen 10. The mesh structure 90 has a plurality of through holes 91 for the passage of the dust. In this way, in the process of drying materials by a dry airflow, impurities such as dust pass through the through hole 91 and then are attached to the dustproof screen 10. On the one hand, it is ensured that the dust and other impurities are attached to the dustproof screen 10 to prevent dust from flying. On the one hand, impurities such as dust attached to the dustproof screen 10 are prevented from falling on the material conveying belt 80 again.

In some embodiments of the present disclosure, the dustproof equipment further includes a control device. The dryer dustproof screen back-blowing unblocking device has a back-blowing state in which a back-blowing fan-shaped nozzle 60 sprays gas or liquid to the dustproof screen 10 and a non-working state in which the back-blowing fan-shaped nozzle 60 does not spray gas or liquid, and the control device is connected with an air source valve of the back-blowing unblocking device for the dustproof screen of the dryer to control a working state of the air source valve to make the back-blowing unblocking device for the dustproof screen of the dryer switched between the back-blowing state and the non-working state. When the material conveyor belt 80 conveys materials, the control device controls the back-blowing unblocking device for the dustproof screen of the dryer to be in the non-working state. In this way, the above arrangement makes it easier and convenient for workers to operate the back-blowing unblocking device for the dustproof screen of the dryer, reduces the difficulty of control, and reduces the labor intensity of the workers.

Specifically, when the material conveyor belt 80 conveys materials, the dry airflow is blown toward the materials to dry the materials, and at this time, the back-blowing unblocking device for the dustproof screen of the dryer is in the non-working state. After the dry airflow completes the drying operation on the materials and the dustproof screen 10 needs to be cleaned, the control device controls the back-blowing fan-shaped nozzles 60 so that the back-blowing fan-shaped nozzles 60 spray gas or liquid to the dustproof screen 10, and the back-blowing unblocking device for the dustproof screen of the dryer is in the back-blowing state to clean the dustproof screen 10.

As shown in FIG. 1 to FIG. 6, the dustproof equipment includes a plurality of sub-dustproof assemblies 100. The plurality of sub-dustproof assemblies 100 are disposed at intervals in a conveying direction of the material conveyor belt 80. Each of the plurality of sub-dustproof assemblies 100 includes a bracket 110. The bracket 110 includes a first support plate body 111 and a second support plate body 112. The first support plate body 111 and the second support plate body 112 are arranged at an angle. One dustproof screen 10 is laid on the first support plate body 111, and another dustproof screen 10 is laid on the second support plate body 112. In this way, the above arrangement makes the mounting of the dustproof screen 10 and the bracket 110 easier and simpler, and reduces the difficulty in disassembly and assembly. Meanwhile, the above arrangement of the first support plate body 111 and the second support plate body 112 increase the contact area between the dustproof screen 10 and dust, thereby ensuring that the dust is attached to the dustproof screen 10. Meanwhile, the above structure is simple, processing and implementation are facilitated, and the processing cost of the dustproof equipment is reduced.

As shown in FIG. 1, FIG. 2, FIG. 4 and FIG. 5, the bracket 110 is of an inverted V-shaped structure. In this way, on the one hand, the above arrangement makes the structure of the each sub-dustproof assembly 100 more stable, and avoids affecting the structural stability of the dustproof equipment due to displacement of the sub-dustproof assembly 100 under an action of the dry airflow. On the other hand, the above arrangement increases the contact area between the dustproof screen 10 and the dust, thereby ensuring that the dust can be completely attached to the dustproof screen 10.

As shown in FIG. 1 and FIG. 2, each of the sub-dustproof assemblies 100 further includes a first pressing plate 120, a second pressing plate 130 and a crimping member. The first pressing plate 120 presses one dustproof screen 10 on the first support plate body 111. The second pressing plate 130 presses one dustproof screen 10 on the second support plate body 112. The adjacent first pressing plate 120 and the second pressing plate 130 are connected through the crimping member 140. In this way, the above arrangement makes the disassembly and assembly of the dustproof screen 10 and the bracket 110 easier and simpler, also improves the connection stability of the bracket 110 and the dustproof screen 10, and avoids affecting the dust suction effect of the dustproof equipment due to displacement of the dustproof screen 10.

In some embodiments of the present disclosure, a first end of the first support plate body 111 and a first end of the second support plate body 112 form a first opening, a second end of the first support plate body 111 and a second end of the second support plate body 112 form a second opening, and the first opening and the second opening are provided with the dustproof screens 10. In this way, the above arrangement further increases the area of the dustproof screen 10, thereby ensuring that dust is sufficiently attached to the dustproof screen 10, and improving the dust suction effect of the dustproof equipment.

In other implementation manners not shown in the drawings, the first end of the first support plate body and the first end of the second support plate body form a first opening, and the first opening is provided with the dustproof screen. In this way, the above arrangement further increases the area of the dustproof screen, thereby ensuring that dust is sufficiently attached to the dustproof screen, and improving the dust suction effect of the dustproof equipment.

In other implementation manners not shown in the drawings, the second end of the first support plate body and the second end of the second support plate body form a second opening, and the second opening is provided with the dustproof screen. In this way, the above arrangement further increases the area of the dustproof screen, thereby ensuring that dust is sufficiently attached to the dustproof screen, and improving the dust suction effect of the dustproof equipment.

In some embodiments of the present disclosure, the dustproof screen 10 is a filter screen. In some embodiments, the filter screen is made of nylon or stainless steel. In this way, the above arrangement reduces a processing cost of the dustproof screen 10, and further reduces the processing cost of the dustproof equipment.

As shown in FIG. 4 to FIG. 6, some embodiments of the present disclosure also provide a dryer, which includes a base 150, a fan 160, a material conveyor belt 80, a bag filter 170, and the dustproof equipment. The fan 160, the material conveyor belt 80, the bag filter 170 and the dustproof equipment are all disposed on the base 150, the material conveyor belt 80 is located between the fan 160 and the dustproof equipment in a height direction of the dryer, and the fan 160 is located below the material conveyor belt 80. The dustproof equipment is the above dustproof equipment. In this way, when the dryer is dehumidifying and drying materials, the fan 160 blows dry hot air toward the material conveyor belt 80 and the dustproof equipment, so that dust and other impurities generated in the drying process are attached to the dustproof screen 10 to avoid dust flying in the working environment and affecting the health of workers.

In some embodiments, the dryer is a closed low-temperature filter cake dryer.

Specifically, the working principle of the dryer is as follows: a material (filter cake) is conveyed to a filter cake slitting device of the dryer through a conveyor belt, and continuously falls onto a first layer of material conveyor belt 80 (located at a low position) in a closed chamber of the dryer after crushing and slitting. The air conditioning heating or hot water coil of a thermal circulation mechanism forms a high-temperature environment of about 65-80° C. The fan 160 provides convective hot air to dry a long filter cake at high temperature. The dried filter cake is transported to a second layer of material conveyor belt 80 (located at a high position), the dustproof screen 10 intercepts dust, the back-blowing unblocking device for the dustproof screen of the dryer cleans the dustproof screen 10, a circulating air cooler of the dryer performs condensation and dehumidification at a low temperature around 25° C., condensed water flows out by own weight, and finally the filter cake with qualified moisture content is transported to a dry silo with a wire mesh conveyor belt. The machine has a moisture content of 55-83% in the feed and a moisture content of 3-50% in the discharge, and is freely adjustable. The dryer in some embodiments of the present disclosure is energy-saving and environmentally friendly, and has the advantages of good filter cake drying effect, high production efficiency, and no filter cake dust hazard.

From the above description, it can be seen that the above embodiments of the present disclosure achieve the following technical effects:

The back-blowing unblocking device for the dustproof screen of the dryer includes a high-pressure air main pipe, a high-pressure air horizontal pipe, high-pressure air branch pipes, shunt connecting pipes, and back-blowing fan-shaped nozzles. When a dustproof screen needs to be cleaned, a worker turns on an air source valve so that gas enters the high-pressure air main pipe through a hose, and gas in the high-pressure air main pipe enters each shut connecting pipe through the high-pressure air horizontal pipe, and gas entering the each shunt connecting pipe enters the high-pressure air branch pipe, and is finally sprayed out through the back-blowing fan-shaped nozzles to clean the dustproof screen.

Compared with the art that requires manual cleaning of the dustproof screen, the back-blowing unblocking device for the dustproof screen of the dryer in some embodiments of the present disclosure replaces the manual cleaning of the dustproof screen, thereby solving the problem in the art known to inventors of increase of the labor intensity of workers caused by difficulty in cleaning a dustproof screen of a dryer, and reducing the labor intensity of the workers. Meanwhile, when the dustproof screen needs to be cleaned, the worker does not need to remove the dustproof screen from the dryer, which further reduces the labor intensity of the worker. In addition, the back-blowing unblocking device for the dustproof screen of the dryer in some embodiments of the present disclosure fully cleans the dustproof screen at one time without multiple cleaning, which improves the cleaning efficiency of the back-blowing unblocking device for the dustproof screen of the dryer.

It is apparent that the described embodiments are only part of the embodiments of the present disclosure, not all of the embodiments. All other embodiments obtained by those of ordinary skill in the art based on the embodiments of the disclosure without creative efforts should fall within the scope of protection of the disclosure.

It is to be noted that terms used herein only aim to describe specific implementation manners, and are not intended to limit exemplar implementations of this disclosure. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here.

The above is only some embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. A dustproof equipment, comprising a frame body, a dustproof screen, and a back-blowing unblocking device for the dustproof screen of a dryer, wherein the back-blowing unblocking device is located above the dustproof screen, the dustproof screen and the back-blowing unblocking device for the dustproof screen of the dryer are both disposed on the frame body, in a process of conveying materials of a material conveyor belt, a dry airflow is blown to the dustproof equipment by the material conveyor belt, so that dust generated in a drying process is attached to the dustproof screen, the back-blowing unblocking device for the dustproof screen of the dryer, fully utilizing a vacant closed compartment space of the dryer, a matching non-stop multi-row back-blowing dense spray high-pressure air unblocking device being added to the dustproof screen, the back-blowing unblocking device for the dustproof screen of the dryer comprising a high-pressure air main pipe, a high-pressure air horizontal pipe, high-pressure air branch pipes, a shunt connecting pipe, and back-blowing fan-shaped nozzles, wherein except for the back-blowing fan-shaped nozzles, all others are welded and formed by stainless steel pipe materials, a length of each high-pressure air branch pipe is equal to a length of at least one A-shaped dustproof screen, both ends of the each high-pressure air branch pipe are closed and an upper center opening is welded to the shunt connecting pipe, both sides of the each high-pressure air branch pipe are densely arranged with the back-blowing fan-shaped nozzles to form a dense spray form, a row number of the high-pressure air branch pipes is equal to a segment number of the at least one A-shaped dustproof screen to form a dense spray form, the back-blowing unblocking device for the dustproof screen of the dryer is mounted on the dustproof screen to make the back-blowing fan-shaped nozzles located between two A-shaped dustproof screens, and the high-pressure air main pipe is connected with an air source valve through a hose;

the dustproof equipment is located above the material conveyor belt;

the dustproof equipment comprises a plurality of sub-dustproof assemblies, the plurality of sub-dustproof assemblies being disposed at intervals in a conveying direction of the material conveyor belt, each of the sub-dustproof assemblies comprising:

a bracket, the bracket comprising a first support plate body and a second support plate body, the first support plate body and the second support plate body being disposed at an angle, one dustproof screen being laid on the first support plate body, and another dustproof screen being laid on the second support plate body.

2. The dustproof equipment according to claim 1, wherein one end of the high-pressure air main pipe is provided with an arc surface that coincides with an outer circle of the high-pressure air horizontal pipe, and the other end of the high-pressure air main pipe is provided with two parallel threads; both ends of the high-pressure air horizontal pipe are closed, an upper side of the high-pressure air horizontal pipe is provided with an air intake hole that coincide with the high-pressure air main pipe, and a lower side of the high-pressure air horizontal pipe is provided with evenly distributed shunt holes that coincide with shunt connecting pipes; and both ends of each of the shunt connecting pipes are provided with arc surfaces that coincide with the shunt holes and an air intake hole of the each high-pressure air branch pipe respectively.

3. The dustproof equipment according to claim 1, wherein one end of the back-blowing fan-shaped nozzle is provided with an arc surface that coincides with an air outlet hole of the high-pressure air branch pipe, and the back-blowing fan-shaped nozzle is welded to the air outlet hole; and the other end of the back-blowing fan-shaped nozzle is provided with a nozzle opening in a fan-shaped spray shape, the nozzle opening comprises a V-shaped groove to form the fan-shaped spray shape, and the nozzle opening has a spray angle of 60° and is machined by a stainless steel material.

4. The dustproof equipment according to claim 1, further comprising:
a mesh structure, located below the dustproof screen, the mesh structure comprising a plurality of through holes for a passage of the dust.

5. The dustproof equipment according to claim 1, further comprising:
a control device, wherein the back-blowing unblocking device for the dustproof screen of the dryer has a back-blowing state in which the back-blowing fan-shaped nozzle sprays gas or liquid to the dustproof screen and a non-working state in which the back-blowing fan-shaped nozzle does not spray gas or liquid, the control device is connected with an air source valve of the back-blowing unblocking device for the dustproof screen of the dryer to control a working state of the air source valve to make the back-blowing unblocking device for the dustproof screen of the dryer switched between the back-blowing state and the non-working state, and when the material conveyor belt conveys materials, the control device controls the back-blowing unblocking device for the dustproof screen of the dryer to be in the non-working state.

6. The dustproof equipment according to claim 1, wherein the bracket is of an inverted V-shaped structure.

7. The dustproof equipment according to claim 1, wherein each of the sub-dustproof assemblies comprises:
a first pressing plate, the first pressing plate pressing one dustproof screen on the first support plate body;
a second pressing plate, the second pressing plate pressing one dustproof screen on the second support plate body; and
a crimping member, the adjacent first pressing plate and the second pressing plate being connected through the crimping member.

8. The dustproof equipment according to claim 1, wherein a first end of the first support plate body and a first end of the second support plate body form a first opening, a second end of the first support plate body and a second end of the second support plate body form a second opening, and the first opening and/or the second opening are provided with the dustproof screens.

9. The dustproof equipment according to claim 1, wherein the dustproof screen is a filter screen, and the filter screen is made of nylon or stainless steel.

10. A dryer, comprising a base, a fan, the material conveyor belt, a bag filter, and the dustproof equipment according to claim 1, wherein the fan, the material conveyor belt, the bag filter and the dustproof equipment are all disposed on the base, the material conveyor belt is located between the fan and the dustproof equipment in a height direction of the dryer, and the fan is located below the material conveyor belt.

11. The dryer according to claim 10, further comprising:
a mesh structure, located below the dustproof screen, the mesh structure comprising a plurality of through holes for a passage of the dust.

12. The dryer according to claim 10, further comprising:
a control device, wherein the back-blowing unblocking device for the dustproof screen of the dryer has a back-blowing state in which the back-blowing fan-shaped nozzle sprays gas or liquid to the dustproof screen and a non-working state in which the back-blowing fan-shaped nozzle does not spray gas or liquid, the control device is connected with an air source valve of the back-blowing unblocking device for the dustproof screen of the dryer to control a working state of the air source valve to make the back-blowing unblocking device for the dustproof screen of the dryer switched between the back-blowing state and the non-working state, and when the material conveyor belt conveys materials, the control device controls the back-blowing unblocking device for the dustproof screen of the dryer to be in the non-working state.

13. The dryer according to claim 10, wherein each of the sub-dustproof assemblies comprises:
- a first pressing plate, the first pressing plate pressing one dustproof screen on the first support plate body;
- a second pressing plate, the second pressing plate pressing one dustproof screen on the second support plate body; and
- a crimping member, the adjacent first pressing plate and the second pressing plate being connected through the crimping member.

14. The dryer according to claim 10, wherein a first end of the first support plate body and a first end of the second support plate body form a first opening, a second end of the first support plate body and a second end of the second support plate body form a second opening, and the first opening and/or the second opening are provided with the dustproof screens.

* * * * *